(12) United States Patent
Colburn et al.

(10) Patent No.: US 10,484,617 B1
(45) Date of Patent: Nov. 19, 2019

(54) IMAGING SYSTEM FOR ADDRESSING SPECULAR REFLECTION

(71) Applicant: Amazon Technologies, Inc., Seattle, WA (US)

(72) Inventors: Robert Alexander Colburn, Seattle, WA (US); James Christopher Curlander, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/994,176

(22) Filed: May 31, 2018

Related U.S. Application Data

(62) Division of application No. 15/677,569, filed on Aug. 15, 2017, now Pat. No. 10,021,315, which is a division of application No. 14/317,318, filed on Jun. 27, 2014, now Pat. No. 9,769,392.

(51) Int. Cl.
*H04N 5/235* (2006.01)
*H04N 5/232* (2006.01)
*H04N 5/225* (2006.01)

(52) U.S. Cl.
CPC ......... *H04N 5/2354* (2013.01); *H04N 5/2256* (2013.01); *H04N 5/23222* (2013.01)

(58) Field of Classification Search
CPC . H04N 5/2256; H04N 5/2354; H04N 5/23222
See application file for complete search history.

(56) References Cited

U.S. PATENT DOCUMENTS

| 7,454,136 | B2 | 11/2008 | Raskar et al. |
| 8,730,356 | B2 | 5/2014 | Ansfield et al. |
| 9,769,392 | B1 | 9/2017 | Colburn et al. |
| 10,021,315 | B1* | 7/2018 | Colburn ............ H04N 5/23222 |
| 2001/0002850 | A1 | 6/2001 | Slatter |
| 2002/0113882 | A1 | 8/2002 | Pollard et al. |
| 2002/0172432 | A1 | 11/2002 | Pilu et al. |
| 2006/0222260 | A1 | 10/2006 | Sambongi et al. |
| 2007/0040035 | A1 | 2/2007 | Kotlarsky et al. |
| 2007/0215706 | A1 | 9/2007 | Kotlarsky et al. |
| 2015/0049218 | A1 | 2/2015 | Fu et al. |

(Continued)

OTHER PUBLICATIONS

A. Agarwala et al., "Interactive Digital Photomontage," SIGGRAPH '04 Conference Proceedings.
(Continued)

*Primary Examiner* — Daniel M Pasiewicz
(74) *Attorney, Agent, or Firm* — Athorus, PLLC

(57) ABSTRACT

The high-intensity specular reflection of light from a surface of an object may create distortions in images of the object, in locations determined based on a perspective of an optical sensor. Multiple images of the object taken from different perspectives may include multiple specular artifacts in different locations, and a composite image of the object that omits such artifacts may be generated based on the multiple images. In particular, pixels of each of the images corresponding to the locations of the specular artifacts and having optimal intensities may be identified. The composite image may be generated based on the pixels having optimal intensities, and by excluding the pixels corresponding to the specular artifacts.

18 Claims, 11 Drawing Sheets

(56) References Cited

U.S. PATENT DOCUMENTS

2015/0350511 A1    12/2015  Kaikumaa
2016/0300376 A1*   10/2016  Fuse .................... G06K 9/4661

OTHER PUBLICATIONS

Artusi et al., "A Survey of Specularity Removal Methods," vol. 30, No. 8, pp. 2208-2230, 2011. Publisher: Computer Graphics Forum.
Ghosh et al., "Practical modeling and acquisition of layered facial reflectance," SIGGRAPH Asia 2008 papers, Dec. 2008, Publisher: SIGGRAPH Asia '08.
Jachnik et al., "Real-time surface light-field capture for augmentation of planar specular surfaces," Mar. 2012, Publisher: Mixed and Augmented.
Lamond et al., "Fast image-based separation of diffuse and specular reflections," SIGGRAPH 2007 sketches, 2007, Publisher: SIGGRAPH '07.
Lecture Slides, Carnegie Mellon University, Sep. 22, 2009. "Basic Principles of Surface Reflectance," Srinivasa Narasimhan (CSD 15-462).
Lin et al., "Separation of diffuse and specular reflection in color images," "Proceedings of the 2001 IEEE Computer Society Conference," vol. 1, pp. 1-341-1-1346, 2001. Publisher: Computer Vision and Pattern Recognition, 2001. CVPR 2001.
Narasimhan, Srinivasa, "Computer Graphics," Syllabus, Last Update Dec. 5, 2009, URL: http://www.cs.cmu.edu/afs/cs/academic/class/15462-f09/www/, downloaded on May 9, 2017, 9 pages.
Nishino et al., "Determining reflectance parameters and illumination distribution from a sparse set of images for view-dependent image synthesis," "ICCV 2001. Proceedings," vol. 1, pp. 599-606, 2001. Publisher: Eighth IEEE International Conference on the Computer Vision.
P. Debevec et al., "Acquiring the Reflectance Field of a Human Face," SIGGRAPH 2000 Conference Proceedings.
P. Dutré, K. Bala, and P. Bekaert, Advanced global illumination, Ch. 2, 2nd ed., A K Peters Ltd, 2006.
Phong et al., "Illumination for computer generated pictures," vol. 18, No. 6, Jun. 1975, Publisher: Communications of the ACM.
Shen et al., "Chromaticity-based separation of reflection components in a single image," "Pattern Recognition," vol. 41, No. 8, pp. 2461-2469, Aug. 2008.
Swaminathan et al., "On the motion and appearance of specularities in image sequences," "Computer Vision," 2002, pp. 508-523, Publisher: ECCV 2002.
T.A. Harvey et al., "Measuring Spatially- and Directionally-varying Light Scattering from Biological Material," Journal of Visualized Experiments, dated May 20, 2013.
Tan et al., "Separating reflection components of textured surfaces using a single image," "Pattern Analysis and Machine Intelligence," Publisher: IEEE Transactions on Pattern Analysis and Machine Intelligence, vol. 27, No. 2, pp. 178-193, Feb. 2005.
Yu et al., "Sparse lumigraph relighting by illumination and reflectance estimation from multi-view images," "SIGGRAPH 2006 Sketches," Jul. 2006. Publisher: SIGGRAPH '06.

* cited by examiner

IMAGING SYSTEM FOR ADDRESSING SPECULAR REFLECTION

CROSS-REFERENCE TO RELATED APPLICATIONS

This application is a divisional of and claims priority to U.S. patent application Ser. No. 15/677,569, filed Aug. 15, 2017, entitled "Imaging System for Addressing Specular Reflection," and claims priority to U.S. patent application Ser. No. 14/317,318, U.S. Pat. No. 9,769,392, filed Jun. 27, 2014, entitled "Imaging System for Addressing Specular Reflection," the contents of which are incorporated by reference herein in their entirety.

BACKGROUND

Light that is projected onto a scene interacts with various objects within the scene by being reflected or transmitted at one or more boundaries of surfaces of such objects, or by being absorbed by such surfaces and dissipated as heat. Light typically reflects from surfaces of objects according to the law of reflection, which states that the angle of incidence of a ray with respect to a normal of a surface is equal to the angle of reflection of a ray with respect to the normal of the surface, such that an angle at which an incident ray arrives at a surface is equal to an angle from which a reflected ray departs from the surface.

Different materials may interact with incident light in different ways, and the appearance of such materials may vary given the same lighting conditions. For example, some materials or portions of surfaces thereof may appear as mirrors, and reflect substantial portions of the incident light, while other materials may appear as diffuse surfaces. A manner in which a material appears in the presence of incident light is typically driven by the reflectance properties of one or more surfaces of the material.

Specular reflection is the reflection of light from a smooth surface of an object, which thereby causes the incident rays to be reflected at common angles of reflection. Some common examples of specularly reflected light include visible light that is reflected from a pane of glass or a surface of a pond. Specular reflection may be particularly acute where the incident light originates from a single point, such as the sun, or from a single, particularly bright artificial light source. Diffuse reflection is the reflection of light from a coarse or rough surface of an object, which thereby causes the incident rays to be reflected at varying disparate angles of reflection. Some common examples of diffusely reflected light include visible light that is reflected from a paved roadway or a sandy beach.

An imaging device such as a digital camera operates by capturing information or data regarding light that is reflected from a surface of an object. The reflected light may originate either from the sun or from an artificial light source, e.g., an overhead or nearby light source (e.g., lamps or ceiling lights), as well as a flash mounted to the imaging device. Therefore, depending on the texture of the surface of the object that is being photographed, the light that is reflected from the surface may be diffusely reflected or specularly reflected.

When an imaging device such as a digital camera that is aligned in a particular location or at a particular orientation captures an image of an object that includes specularly reflected light, e.g., an object with extremely smooth and reflective surfaces, the sensor of the digital camera may be dominated by the concentrated nature of the specularly reflected rays, which may cause regions of pixels corresponding to the portions of a surface from which such specularly reflected rays originate within an image to be overexposed. The visual effects of the specular reflections within the image may further extend or spill over into other neighboring pixels, as well.

DETAILED DESCRIPTION

Figure 1:
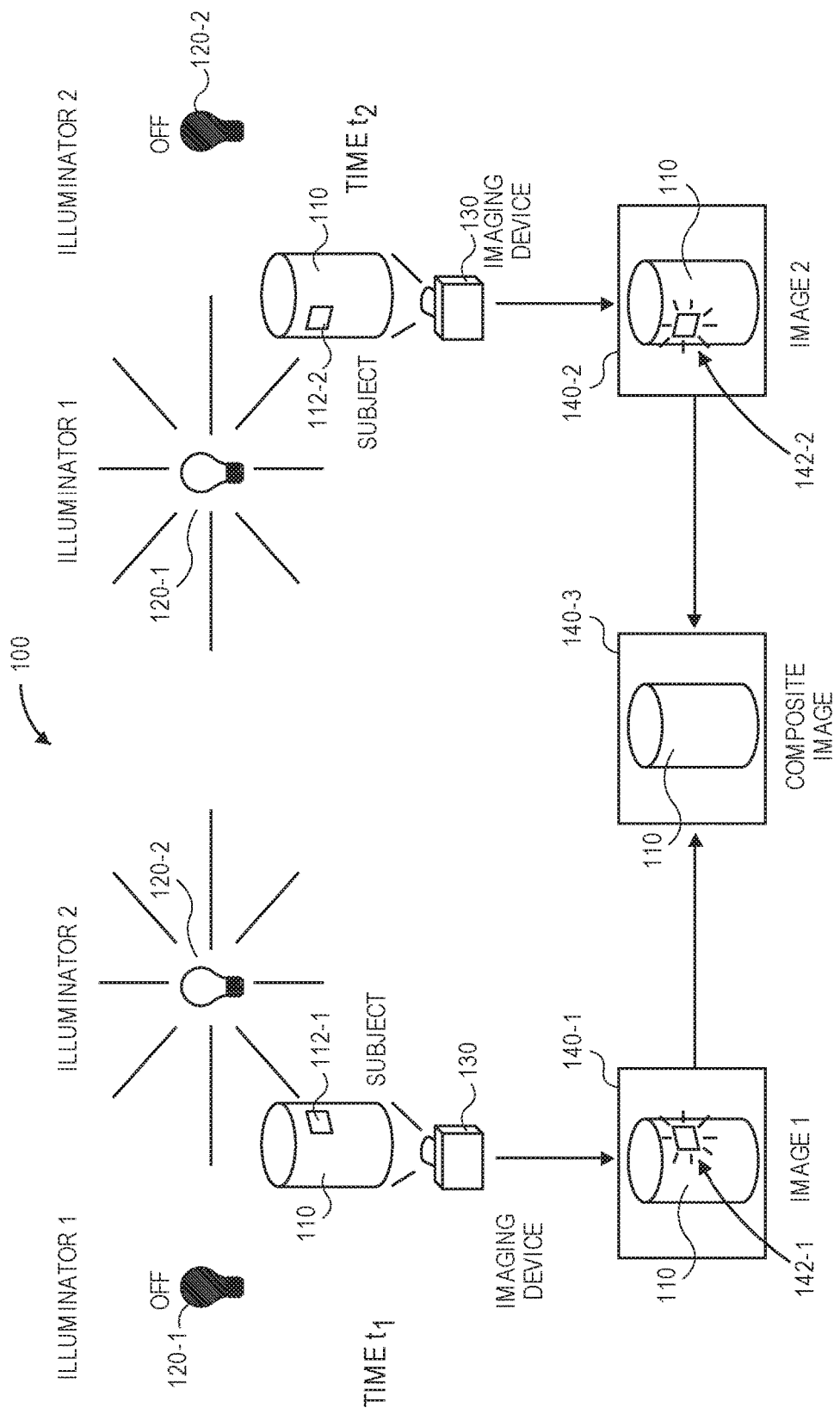
FIG. 1 is a view of components of an imaging system for addressing specular reflections in accordance with embodiments of the present disclosure.

As is set forth in greater detail below, the present disclosure is directed to reducing or minimizing the adverse effects of specular reflection from imaging data. Specifically, the systems and methods of the present disclosure are directed to illuminating an object under multiple independent lighting conditions, capturing sets of imaging data based on light reflected from the object under two or more of the lighting conditions, identifying any aspects of the imaging data that correspond to specular reflections from the object, processing the imaging data to remove such aspects therefrom, and generating an image of the object that does not include any of the specular reflections from the processed imaging data. The lighting conditions may be provided by illuminating the object using different addressable illuminators or other addressable lighting elements, which may be provided in groups or concentrations arranged in an array, or by capturing such imaging data using one or more different imaging devices, where such addressable lighting elements or imaging devices are provided in different locations or orientations with respect to the object.

Incident light that contacts a surface at a specific angle with respect to a normal from the surface may be specularly reflected at an exitant angle that is equal to the incident angle, and the intensity of the reflected light is a function of not only the intensity of the incident light but also the relative smoothness of the surface from which the light is reflected. Where a sufficiently smooth object is illuminated by incident light provided from a light source at a specific angle, and an image of the object is captured, light that is specularly reflected from a particular point on a surface of the object may cause a specular artifact or specular defect to appear within the image. The specular artifact or specular defect may be characterized by regions of high-intensity pixels in regions corresponding to the point of specular reflection on the surface of the object within the image, thereby preventing a clear and accurate depiction of the object from being generated.

The difficulties posed by the presence of specular artifacts or specular defects within images are particularly acute in a fulfillment center environment, which is frequently illuminated by large numbers of fluorescent lighting elements that project substantially white light onto objects or surroundings from above. Because many items that are received or stored at a fulfillment center, or prepared for delivery to customers at the fulfillment center, are wrapped with smooth, shiny plastic-like materials including but not limited to one or more polyurethanes, polyesters, epoxy resins, phenolic resins, polyethylenes, polypropylenes or polyvinyl chlorides, images of such an item that are captured within the fulfillment center are commonly marked with one or more specular artifacts or specular defects, which mar the appearance of the item within the images and prevent an accurate depiction of the item from being recorded.

Therefore, in accordance with the present disclosure, the operation of addressable illuminators or other addressable lighting elements and imaging devices may be manipulated using one or more computer processors or other computing devices in order to reduce or minimize the effects of specular artifacts or specular defects within imaging data or images. Furthermore, the processing of imaging data or images captured by such imaging devices may comprise identifying pixels or regions of pixels corresponding to specular artifacts or specular defects within sets of imaging data or images, obtaining analogous pixels or regions of pixels from other sets of imaging data or images that do not include such specular artifacts or specular defects, which may include the optimal intensity levels (e.g., the lowest available intensity levels) for such pixels among the various sets of imaging data, and generating an aggregate or composite image based on the analogous pixels or regions of pixels which minimizes or reduces the effects of such specular artifacts or specular defects.

Because the effects of specular reflection observed by an imaging device are dependent upon lighting conditions established by a position or orientation of a light source, a position or orientation of the imaging device, or positions or orientations of multiple light sources or imaging devices, varying either a position or an orientation of a light source, or a position or an orientation of an imaging device, will result in a different specularly reflected condition within each set of imaging data captured by the imaging device. Therefore, an image that does not include any effects of specular reflection, e.g., specular artifacts or specular defects, may be generated from two or more sets of imaging data, even if such sets of imaging data contain one or more of such effects therein.

Referring to FIG. 1, a view of an imaging system 100 for addressing specular reflections in accordance with embodiments of the present disclosure is shown. The system 100 includes a subject 110, a pair of illuminators 120-1, 120-2 and an imaging device 130. The illuminators 120-1, 120-2 are shown in discrete locations with respect to the subject 110, while the imaging device is aligned to capture imaging data (e.g., digital images) of the subject 110.

The system 100 is shown at times $t_1$, $t_2$, in different lighting conditions. For example, as is shown in FIG. 1, at time $t_1$, the illuminator 120-1 is off, and the illuminator 120-2 is on. Thus, light from the illuminator 120-2 creates a point 112-1 of specular reflection on the subject 110, from the perspective of the imaging device 130. Therefore, an image 140-1 of the subject 110 that is captured using the imaging device 130 at time $t_1$ includes a specular artifact (or specular defect) 142-1 corresponding to the point 112-1 of specular reflection on the subject 110. Similarly, at time $t_2$, the illuminator 120-1 is on, and the illuminator 120-2 is off. Thus, light from the illuminator 120-1 creates a point 112-2 of specular reflection on the subject, from the perspective of the imaging device 130.

Therefore, an image 140-2 of the subject 110 that is captured using the imaging device 130 at time $t_2$ includes a specular artifact 142-2 corresponding to the point 112-2 of specular reflection on the subject 110. Because the lighting conditions are different at time $t_1$ and at time $t_2$, e.g., because the illuminator 120-1 is off at time $t_1$ and on at time $t_2$, and because the illuminator 120-2 is on at time $t_1$ and off at time $t_2$, the locations of the points 112-1, 112-2 of specular reflection on the subject 110 are different at time $t_1$ and at time $t_2$, and the specular artifacts 142-1, 142-2 expressed in the image 140-1 captured at time $t_1$ and the image 140-2 captured at time $t_2$ are also different.

As is discussed above, the systems and methods of the present disclosure directed to reducing the effects of specular reflection by capturing images or imaging data of a subject in different lighting conditions, determining the intensities of reflected light from each of the images or sets of imaging data, and generating an aggregate or composite image based on the most optimal intensities of the reflected light expressed in each of the images or the sets of imaging data. For example, because specular reflections typically result in focused, high-intensity beams of light from discrete points on objects, the pixels of two different images that are captured in discrete lighting conditions may include the points of specular reflection on the objects with different intensities. Therefore, as is shown in FIG. 1, a composite image 140-3 that lacks either of the specular artifacts 142-1, 142-2 included in either of the images 140-1, 140-2 captured at times $t_1$ and $t_2$, respectively, may be generated from the imaging data associated with each of the images 140-1, 140-2.

Modern imaging devices such as digital cameras operate by electronically capturing reflected light from objects and assigning quantitative values to one or more aspects of the reflected light, such as pixels. Unlike a traditional camera, which directs light passing through an optical element toward an array of light-sensitive chemical receptors that are embedded in a film, and exploits the chemical reactions occurring thereon to generate an image associated with the passed light, a digital camera may include one or more sensors having one or more filters associated therewith. The sensors of a digital camera may capture information regarding any number of pixels of the reflected light corresponding to one or more base colors (e.g., red, green or blue) expressed in the reflected light, and store values associated with the pixel colors as one or more data files in a data store or transmit such values to an external computer device for further analysis or reproduction. A digital camera may also include one or more onboard data stores, as well as one or more removable data stores (e.g., stick drives or memory cards), and the data files stored in the one or more data stores may be printed onto paper, displayed on one or more computer displays, or subjected to one or more analyses, such as to identify items expressed therein.

An imaging device may capture one or more images of items within its field of view, which is determined as a function of a distance between a sensor and a lens, viz., a focal length, within the imaging device. Where an object appears within a depth of field, or a distance within the field of view where the clarity and focus is sufficiently sharp, a digital camera may capture light that is reflected off objects of any kind to a sufficiently high degree of resolution using the sensor, and store information regarding the reflected light in one or more data files.

Information and/or data regarding features or objects expressed in a digital image may be extracted from the image in any number of ways. For example, a color of a pixel, or a group of pixels in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of a image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In order to enhance the available lighting in a vicinity of a subject from which imaging data is captured by an imaging device, and to thereby increase the amount or change the quality of light reflected from the imaged subject, one or more flash units or other illuminators is commonly provided. Such illuminators may be mounted directly to an imaging device, or provided in a separate structure, and may consist of a single point source, or multiple point sources, which may be programmed or controlled to shine light onto an object in advance of, or simultaneous with, the capturing of images or imaging data therefrom.

Generally speaking, incident light reaches a surface at a specific point and from a specific direction, and may depart the surface as reflected radiant light from another point and in another direction. For simplicity, it is commonly assumed that radiant light is reflected from a surface at the same point at which the incident light arrives. With this assumption, the reflectance properties of a surface may be modeled according to a bidirectional reflectance distribution function, or "BRDF," which is defined as a ratio of differential radiance reflected in an exitant direction to the differential irradiance incident at a given angle. A surface having reflectance properties that may be modeled using the BDRF and which obey Lambert's cosine law is sometimes called a diffuse surface, which reflects light uniformly across an entire reflecting surface. Conversely, a specular surface is a smooth surface that reflects light in a specific direction. In reality, most surfaces have a combination of diffuse and specular reflective properties.

Specular reflection is a photographic phenomenon that occurs when light is reflected from a particularly smooth surface, and results in a concentration of reflected light at one or more points of an imaged subject. Unlike diffuse reflection, which occurs when light is reflected from a particularly rough or coarse surface, with intensities that may be estimated according to Lambert's cosine law, and typically embodies a Lambertian reflection or distribution of a luminous intensity, specular reflection is characterized by the reflection of multiple incident rays at common angles. Where specular reflection from a subject is observed using an imaging device, the concentration of the specularly reflected rays may saturate or otherwise overexpose one or more sensors of the imaging device in that area, thereby rendering the portions of the underlying subject unrecognizable or invisible within a vicinity of specular artifacts, e.g., pixels corresponding to the point of specular reflection of light from the object as expressed within the imaging data.

The extent and the intensity of a specular reflection or specularly reflected light within an image captured using an imaging device are typically recognized as being dependent upon an angle of incidence of light upon the object (e.g., from an illuminator or another light source), such that specularly reflected light at an angle of reflectance that is typically equal in magnitude to the angle of incidence with respect to a normal extending from the surface of the object at the point of specular reflection. The extent and intensity of the specular reflection or specularly reflected light within the image is also defined based on the smoothness or roughness properties of the object, such that a surface having irregularities that are relatively small with respect to wavelengths of incident light (e.g., a smoother surface) is more likely to specularly reflect light and less likely to diffusely reflect light, while a surface having irregularities that are relatively large with respect to wavelengths of incident light (e.g., a rougher surface) is more likely to diffusely reflect light and less likely to specularly reflect light. Moreover, the degrees of the difficulties associated with the specular reflection of light may vary based on the circumstances in which the specular reflections are observed. For example, in a fulfillment center environment, many objects are packaged or wrapped in one or more smooth and thin layers of plastic, sheet wrap, laminates or other like materials. Because fulfillment centers may be cavernous indoor facilities with large numbers of artificial light sources, e.g., fluorescent lights or light emitting diode ("LED") lights, the specular reflection of light from such surfaces is quite common.

The reflective properties of a given surface may be estimated according to one or more mathematical or statistical models or functions. For example, the BRDF may be used to determine a ratio of the incident light from a first direction or angle with respect to a normal to the radiant light that is reflected from the surface to a second direction or angle with respect to the normal, as a function of the angles of incidence and reflection of the surface. Other models or functions for estimating the properties of the reflected light, including but not limited to spatially varying bidirectional reflectance distribution functions, bidirectional texture functions or bidirectional surface scattering reflectance distribution functions, may be utilized in accordance with the present disclosure.

Therefore, modifying one or more of the positions or orientations of illuminators or imaging devices may result in specular reflections at different points on an object, or of different levels of intensity. Images or imaging data that are captured using imaging devices or illuminators in different positions or orientations with regard to the object will therefore capture or record specular reflections of light from the object in different manners.

The systems and methods of the present disclosure are directed to reducing or minimizing the effects of the specular reflection of light from images or imaging data of items, including but not limited to items having one or more smooth surfaces. In particular, the systems and methods of the present disclosure may be used to capture images or sets of imaging data of a subject in one or more discrete lighting conditions, e.g., using different illuminators or patterns of illuminators to cast light upon the subject, or by using one or more imaging devices provided in different locations or aligned in different orientations with respect to the subject. The images or sets of imaging data may be evaluated to identify the portions of such images or imaging data that include specular artifacts created as a result of any specular reflections of light from one or more surfaces of the subject.

Subsequently, the images or imaging data may be processed to identify pixels within the images or sets of imaging data that correspond to light reflected from the object at optimal levels of intensity. Specular artifacts or specular defects in images or imaging data regarding objects are typically characterized by high-intensity beams of light reflected from discrete points on the objects. Therefore, pixels of two different images that are captured under different lighting conditions may include points of specular reflection on the objects in different locations or at different intensities. An aggregate or composite image of the subject may be generated based on the available pixels which would depict the subject in the most optimal manner, such as by identifying high-intensity pixels in a first image which define a specular artifact, and by identifying lower-intensity pixels in a second image which correspond to the location of the specular artifact in the first image.

The systems and methods of the present disclosure may therefore substitute the lower-intensity pixels of the second image for the high-intensity pixels of the first image when generating the aggregate or composite image. If the first image and the second image are captured within short periods of time of one another, the images should remain substantially identical, but for the respective specular artifacts expressed therein. Accordingly, the pixels having the most optimal intensity levels in each of the images may be used to assemble an aggregate or composite image of the subject, and the aggregate or composite image would not include any of the specular artifacts of the images or imaging data.

According to some embodiments of the present disclosure, a subject may be illuminated using a plurality of addressable lights provided in an array or matrix having any number of dimensions. Each of the addressable lights may be operated individually or in groups, in order to illuminate a subject from any number of directions or perspectives. Thus, when the subject is illuminated using a first illuminator, a first image may be captured of the subject using an imaging device. Subsequently, the first illuminator may be shut down, the subject may be illuminated using a second illuminator, and a second image may be captured of the subject using the imaging device. The first image and the second image may be processed in order to identify the pixels of each of the images which correspond to points of specular reflection on the subject, and an aggregate or composite image may be formed from such images using pixels which do not constitute specular artifacts or specular defects.

According to other embodiments of the disclosure, the subject may be illuminated using patterns defined by one or more of the addressable lights of an array or matrix, or groups thereof. The individual addressable lights to be operated in order to illuminate the subject may be selected on any basis, including based at least in part on any relevant information that may be known regarding the size, shape or orientation of the subject, as well as the relative smoothness of one or more surfaces of the subject, or the orientation of an imaging device with respect to a position of the object. Additionally, the addressable lights may be illuminated or secured in any pattern in order to ensure a sufficient separation between points of specular reflection on a surface of the subject, and the operation of the shutter may be synchronized with the operation of the addressable lights in order to ensure that images of the subject are captured in various illuminating conditions. Alternatively, the various addressable lights may be sampled or tested at random in order to determine an appropriate pattern or sequence of lights to be operated when illuminating a particular subject for which no prior history may be available.

Once a plurality of images is captured under different illuminating conditions, such images may then be combined in order to form a single aggregate or composite image by taking an optimal intensity value of each pixel across a combination of the images. In some instances, pixels having the lowest available intensity values may be selected as the optimal pixels. In other instances, e.g., where the images include one or more shadows or other features embodied in pixels having relatively low intensities, pixels having optimal intensity levels may be selected. Therefore, the systems and methods disclosed herein may be utilized to quickly capture a number of frames of a subject and to combine such frames into a single image that is free from specular artifacts and has a collective level of quality that is higher than a level of quality of any one of the frames.

Figure 2:
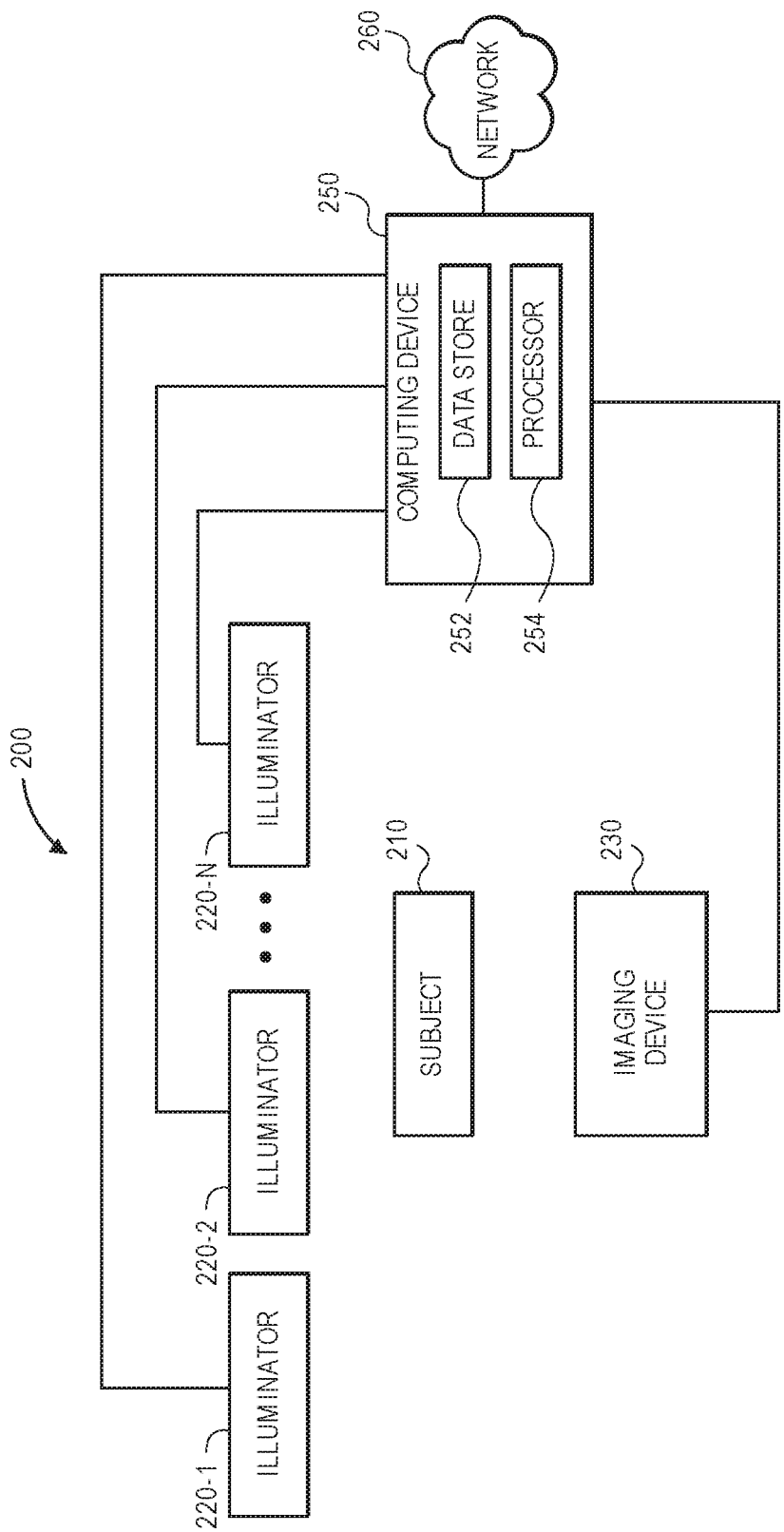
FIG. 2 is a block diagram of components of an imaging system for addressing specular reflections in accordance with embodiments of the present disclosure.

Referring to FIG. 2, a block diagram of one block diagram of components of an imaging system 200 for addressing specular reflections in accordance with embodiments of the present disclosure is shown. The system 200 includes a subject 210, a plurality of n illuminators 220-1, 220-2 . . . 220-*n*, at least one imaging device 230 and a computing device 250 connected to a network 260, such as the Internet.

The subject 210 may be one or more objects, humans, machines or structures from which images or imaging data is desired. For example, in a fulfillment center environment, the subject 210 may be one or more items arriving in an inbound shipment from a vendor, a merchant or a manufacturer, or from another fulfillment center, as well as items being stowed within a storage area of the fulfillment center, items being retrieved from the storage area of the fulfillment center, or items being prepared for delivery to one or more customers in response to an order placed at an online marketplace. In a secure environment such as a transportation facility or bank, the subject 210 may be a person, a vehicle or an object of interest (e.g., a vault or an entryway). Those of ordinary skill in the pertinent art will recognize that the number or type of subjects 210 from which images or imaging data may be captured in accordance with the present disclosure are not limited.

The illuminators 220-1, 220-2 . . . 220-*n* are any form of addressable light source that may be independently operated on short order, by way of one or more commands. For example, the illuminators 220-1, 220-2 . . . 220-*n* may include one or more LED lights arranged at a single point, in a line or strip, in an array or in one or more polygonal arrangements or configurations (e.g., shapes). Such LED lights, or LEDs, may include one or more diodes that are housed within a transparent plastic bulb or canister-like housing and configured to direct a comparatively large amount of light-based energy for release through the housing.

Moreover, as is shown in FIG. 2, the illuminators 220-1, 220-2 . . . 220-n are independently connected with the computing device 250, and may be controlled by way of one or more independently targeted signals received from a hardware component or software interface operating on or associated with the computing device 250, or from an external computing device (not shown) by way of the network 260. Additionally, the illuminators 220-1, 220-2 . . . 220-n may be provided in a single color, or in multiple colors, which may be individually programmed or selected, and may be provided at any level of intensity. In accordance with the present disclosure, the various illuminators 220-1, 220-2 . . . 220-n may be mounted to a wall, a ceiling or another structure, or may be associated with or provided as one or more independent and/or freestanding units.

The imaging device 230 may be any type or form of optical recording device that may be provided for the purpose of capturing one or more images or sets of imaging data of the subject 210 while the subject 210 is illuminated by at least one of the illuminators 220-1, 220-2 . . . 220-n. The imaging device 230 may include or comprise any form of optical recording device (e.g., a digital camera) that may be used to photograph or otherwise record images of objects, or perform any other function. The imaging device 230 may include an actuator, a shutter or a data store, and may be configured to capture one or more still or moving images, as well as any relevant audio signals or other information. The imaging device 230 may be mounted to any structure or frame, e.g., a tripod, and may even be worn about the human body, e.g., on an eyeglasses-type frame or like apparatus. Although the system 200 shown in FIG. 2 includes a single imaging device 230, those of ordinary skill in the pertinent arts will recognize that any number or type of imaging devices (e.g., cameras) may be provided in accordance with the present disclosure.

The computing device 250 includes a data store 252 and a processor 254, and is in communication with the imaging device 230 and each of the illuminators 220-1, 220-2 . . . 220-n. The computing device 250 may thus be configured to transmit one or more instructions associated with the operation of the imaging device 230 or the illuminators 220-1, 220-2 . . . 220-n, or to receive or execute such instructions on behalf of another external computing device (not shown) by way of the network 260. The data store 252 may contain computer program instructions that the processor 254 may execute in order to implement one or more embodiments of the present disclosure, and may further include random access memory ("RAM"), read-only memory ("ROM") or any other form of persistent and/or non-transitory computer-readable media. The data store 252 may further store an operating system thereon, for the purpose of providing general administration and operation functions for the processor 254 and other components of the system 200, as well as other information for implementing any aspects of the present disclosure.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by an "imaging device," an "illuminator," or a "computing device" may be automated steps performed by computer systems, or implemented within software modules (or computer programs) executed by one or more general purpose computers. Moreover, process steps described as being performed by an "imaging device," an "illuminator," or a "computing device" may be typically performed by a human operator, but could, alternatively, be performed by an automated agent.

The illuminators 220-1, 220-2 . . . 220-n, the imaging device 230 and/or the computing device 250 may use any web-enabled or Internet applications or features, or any other client-server applications or features including electronic mail (or E-mail), or other messaging techniques, to connect to the network 260 or to communicate with one another, or with other external computing devices (not shown), such as through short or multimedia messaging service (SMS or MMS) text messages. Additionally, those of ordinary skill in the pertinent art would recognize that the computing device 250 may be any type of device that is capable of providing one or more instructions to the illuminators 220-1, 220-2 . . . 220-n or the imaging device 230, or other components, as well as communicating over the network 260, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the computing device 230, or any computers or control systems utilized in accordance with the illuminators 220-1, 220-2 . . . 220-n or the imaging device 230 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
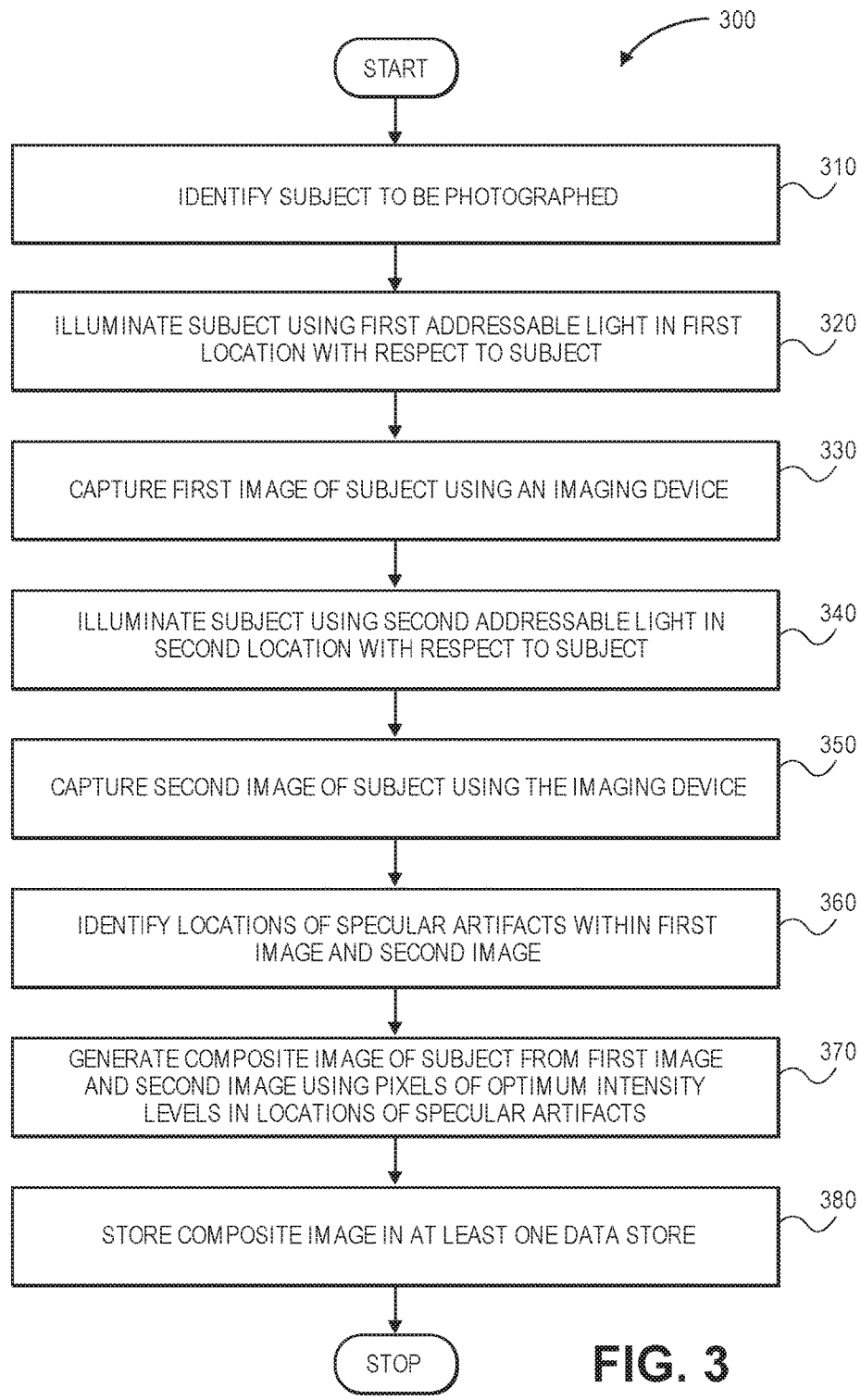
FIG. 3 is a flow chart of one process for capturing images using an imaging system for addressing specular reflections in accordance with embodiments of the present disclosure.

As is discussed above, the systems and methods of the present disclosure may be used to quickly generate clear and accurate images of a subject which avoid the adverse effects of specular reflection, and are free from specular artifacts, by taking the minimum levels of intensity of each pixel across a number of images of the subject taken in varying illuminating conditions, and combining such pixels into a single, composite image. Referring to FIG. 3, a flow chart 300 of one process for capturing images using an imaging system for addressing specular reflections in accordance with embodiments of the present disclosure is shown. At box 310, a subject to be photographed is identified. The subject may be any type or form of an object, a human, a machine or a structure for which an image or imaging data are desired.

At box 320, the subject is illuminated using a first addressable light that is provided in a first location with respect to the subject. For example, a LED light that is mounted in a given orientation or location and configured to be individually controlled by a computing device or other like machine may be instructed to direct light onto the subject from the first location. At box 330, a first image of the subject is captured using an imaging device. The operation of the imaging device may be synchronized with the operation of the first addressable light, such that the first image is captured as the first addressable light illuminates the subject.

At box 340, the subject is illuminated using a second addressable light that is provided in a second location with respect to the subject. For example, another LED light that is also mounted in a given orientation or location and configured to be individually controlled by a computing device or other like machine may be instructed to direct light onto the subject from the second location. At box 350, a second image of the subject is captured using the imaging device that captured the first image of the subject at box 330. The operation of the imaging device may also be synchronized with the operation of the second addressable light, such that the second image is captured as the subject is illuminated by the second addressable light, and after the first addressable light has been turned off or otherwise deactivated. At box 360, locations of specular artifacts within the first image and the second image are identified. Such specular artifacts may be characterized by pixels having abnormally high intensities of light, as compared to the intensities of surrounding pixels, and may occupy not only the pixels corresponding to the reflected radiant light as captured by a sensor of the imaging device but also one or more pixels which surround such pixels.

At box 370, a composite image of the subject is generated from pixels of the first and second images that have the optimum intensities of reflected light therefrom. As is discussed above with regard to the images 140-1, 140-2 of FIG. 1, the composite image may be formed from pixels that correspond to the subject and have optimal levels of intensity in either of the images. For example, where the first image includes pixels defining a specular artifact in a given location, the corresponding pixels of the second image, which are typically of lower intensity, may be utilized when forming the composite image. Because the illumination of the subject using addressable lights provided in discrete locations may result in specular reflections of light from different points on a surface of the subject, the effects of specular reflections created by high-intensity light within such images may be removed when generating the composite images. In this regard, where one or both of the first image and the second image features a specular artifact in different locations, the composite image may be formed without either specular artifact by evaluating the respective pixels of each image, identifying the pixels having the most appropriate intensity levels, which may include but are not limited to the available pixels of the lowest intensities, and combining such pixels into the composite image. At box 380, the composite image is stored in at least one data store, and the process ends.

Figure 4:
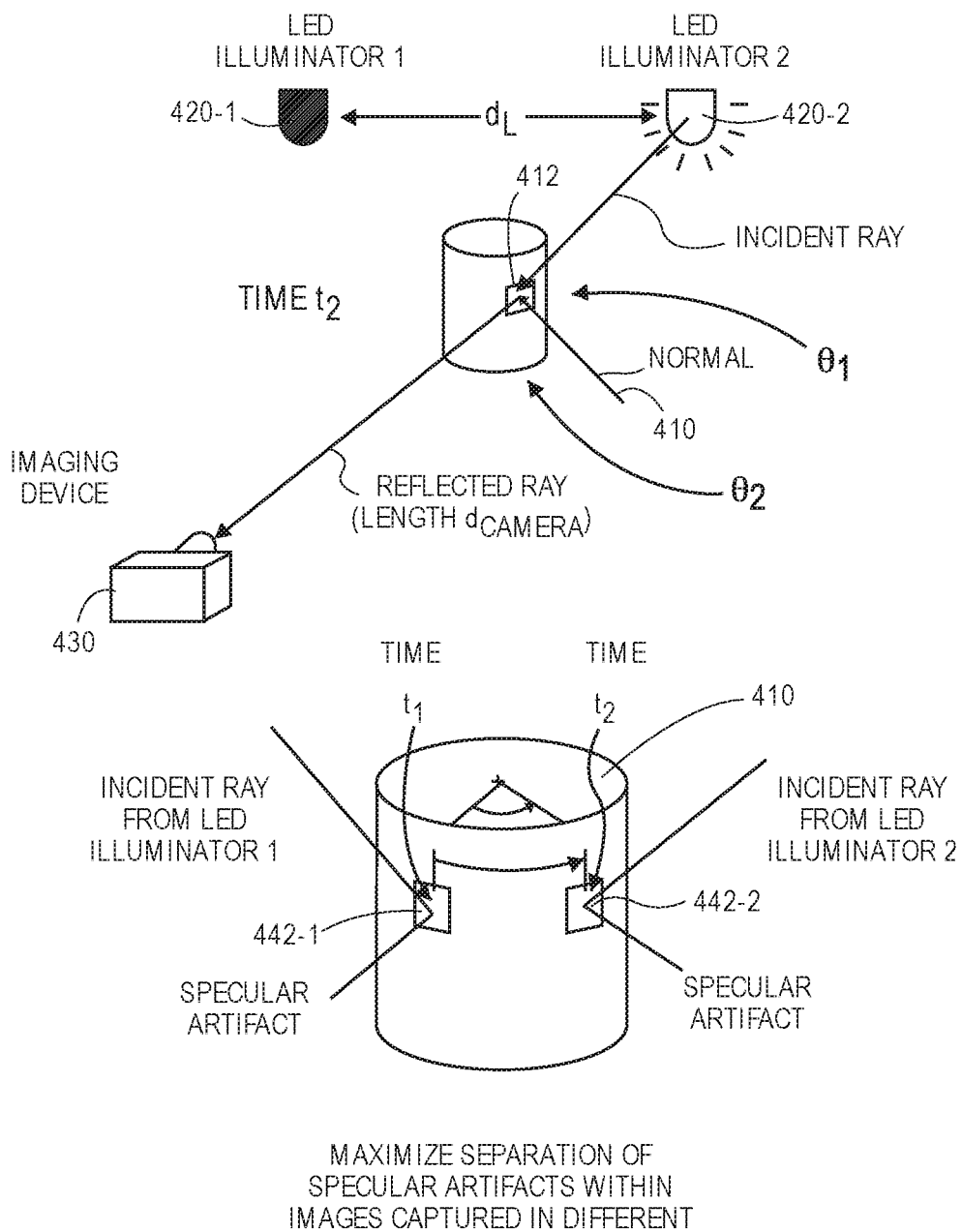
FIG. 4 is a view of components of an imaging system for addressing specular reflections in accordance with embodiments of the present disclosure.

The origin of a specular artifact provided in an image of a subject, and a manner in which the effects of specular artifacts may be reduced in a composite image of the subject, are shown with regard to FIG. 4. Referring to FIG. 4, components of an imaging system 400 for addressing specular reflections in accordance with embodiments of the present disclosure are shown. Except where otherwise noted, reference numerals preceded by the number "4" in FIG. 4 indicate components or features that are similar to components or features having reference numerals preceded by the number "2" shown in FIG. 2, or by the number "1" shown in FIG. 1.

The system 400 of FIG. 4 includes a subject 410, a pair of LED illuminators 420-1, 420-2 and an imaging device 430 (e.g., a digital camera). As is shown in FIG. 4, the illuminators 420-1, 420-2 are separated by a distance $d_L$, while the illuminator 420-1 is off at time $t_2$, and the illuminator 420-2 is on. As is also shown in FIG. 4, light provided from the illuminator 420-2 reflects off a smooth surface of the subject 410 at a point 412 of specular reflection. In particular, incident rays of light from the illuminator 420-2 strike the subject 410, and radiant rays of the light are reflected toward the imaging device 430. The amount or intensity of the light reflected from the subject 410 at the point 412 of specular reflection is a function of the texture of a surface of the subject 410, e.g., the relative smoothness or roughness of the surface of the subject 410 at the point 412 with respect to the wavelengths of the incident light, as well as an incident angle of the light with respect to a normal from the surface, and an angle from the surface to the imaging device 430 with respect to the normal. In particular, as is shown in FIG. 4, a specular artifact 442-1, 442-2 will be observed by the imaging device 430 when an angle formed by the incident light from the illuminator 420-1 with respect to a normal at the point 412 on the subject 410, e.g., angle $\theta_1$, is equal to an angle formed by the reflected light from the point 412 to the imaging device 430 with respect to the normal at the point 412, e.g., angle $\theta_2$, and if the surface of the subject 410 is sufficiently smooth at the point 412.

According to the present disclosure, the placement and the operation of illuminators, such as the illuminators 420-1, 420-2 of FIG. 4, may be selected for the purpose of maximizing the separation between the specular artifacts 442-1, 442-2 within images or imaging data captured using the imaging device 430 in different lighting conditions, e.g., at times when the subject is illuminated by the respective illuminators 420-1, 420-2. In particular, the distance $d_L$ between the illuminators 420-1, 420-2 may be selected based on the shape of the subject 410 in order to ensure that the specular artifacts 442-1, 442-2 within the images of the subject 410 as captured by the imaging device 430 are sufficiently separated so that an aggregate or composite image of the subject 410 may be formed from such images.

Figure 5:
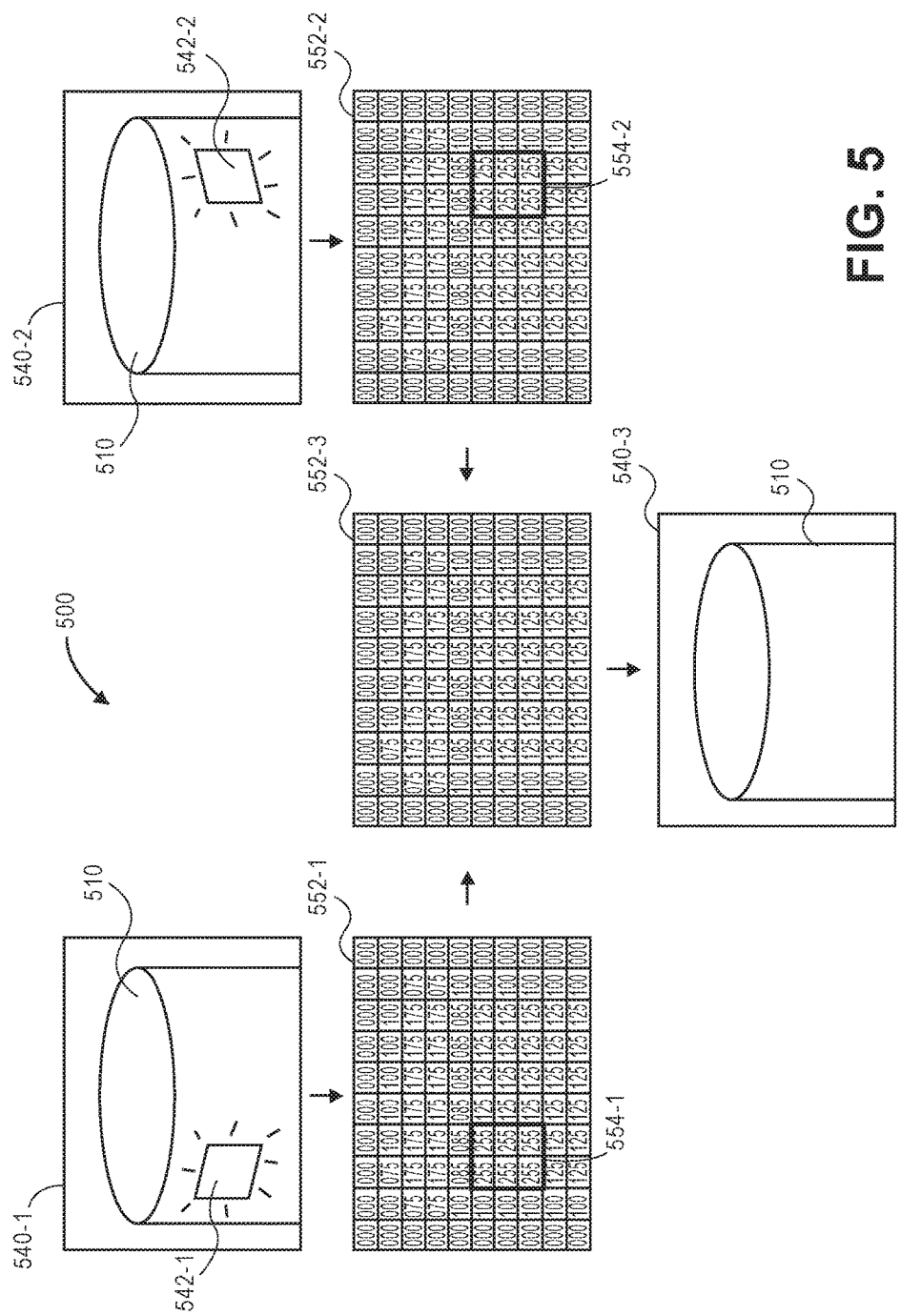
FIG. 5 is a flow diagram of one process for capturing images using an imaging system for addressing specular reflections in accordance with embodiments of the present disclosure.

The formation of an aggregate or composite image using two or more other images or sets of imaging data that include specular artifacts is shown with regard to FIG. 5. Referring to FIG. 5, a pair of images 540-1, 540-2 of a subject 510 are shown. Except where otherwise noted, reference numerals preceded by the number "5" in FIG. 5 indicate components or features that are similar to components or features having reference numerals preceded by the number "4" in FIG. 4, by the number "2" shown in FIG. 2, or by the number "1" shown in FIG. 1.

As is shown in FIG. 5, the image 540-1 includes a specular artifact 542-1 on a left side of the subject 510, while the image 540-2 includes a specular artifact 542-2 on a right side of the subject 510. From each of the images 540-1, 540-2, a set of pixel data 552-1, 552-2 may be identified. The sets of pixel data 552-1, 552-2 includes values corresponding to intensity levels of the pixels of the images 540-1, 540-2. In particular, each of the sets of pixel data 552-1, 552-2 further includes a subset 554-1, 554-2 corresponding to data associated with the specular artifacts 542-1, 542-2 in the images 540-1, 540-2.

In accordance with the present disclosure, an aggregate or composite image 540-3 may be formed by identifying the optimal intensity pixels corresponding to the subject 510 from multiple images and combining such pixels into a single image. For example, as is shown in FIG. 5, the set of pixel data 552-3 is formed based on the minimum values of the pixel data in either of the respective sets 552-1, 552-2. From the set of pixel data 552-3, the aggregate or composite image 540-3 of the subject 510 which lacks either of the specular artifacts 542-1, 542-2 that had appeared in the images 540-1, 540-2 may be formed. The locations of pixels indicative of the specular artifacts 542-1, 542-2 within the respective sets 552-1, 552-2 may be determined on any basis, such as a relative differences in intensities of pixels and one or more of their respective neighbors. Where a value of an intensity of a pixel in a set of pixel data 552-1, 552-2 exceeds a predetermined threshold value, or exceeds the values of the intensities of one or more of the pixels in a vicinity by a predetermined threshold value, the pixel may be deemed to represent a specular artifact. Thus, pixels which are determined to not constitute or represent a specular artifact may be combined into a single set of pixel data 552-3, on which the aggregate or composite image 540-3 may be based.

Accordingly, where a subject is illuminated under two or more different lighting conditions, and images of the subject are captured using one or more imaging devices, an aggregate or composite image of the subject that does not include any specular artifacts or other evidence of specular reflections may be formed if the lighting conditions are sufficiently distinct, and if any specular artifacts which appear within such images are sufficiently discrete, such that they may be effectively removed when the lowest intensity pixels corresponding to the subject within such images are combined with one another.

Figure 6:
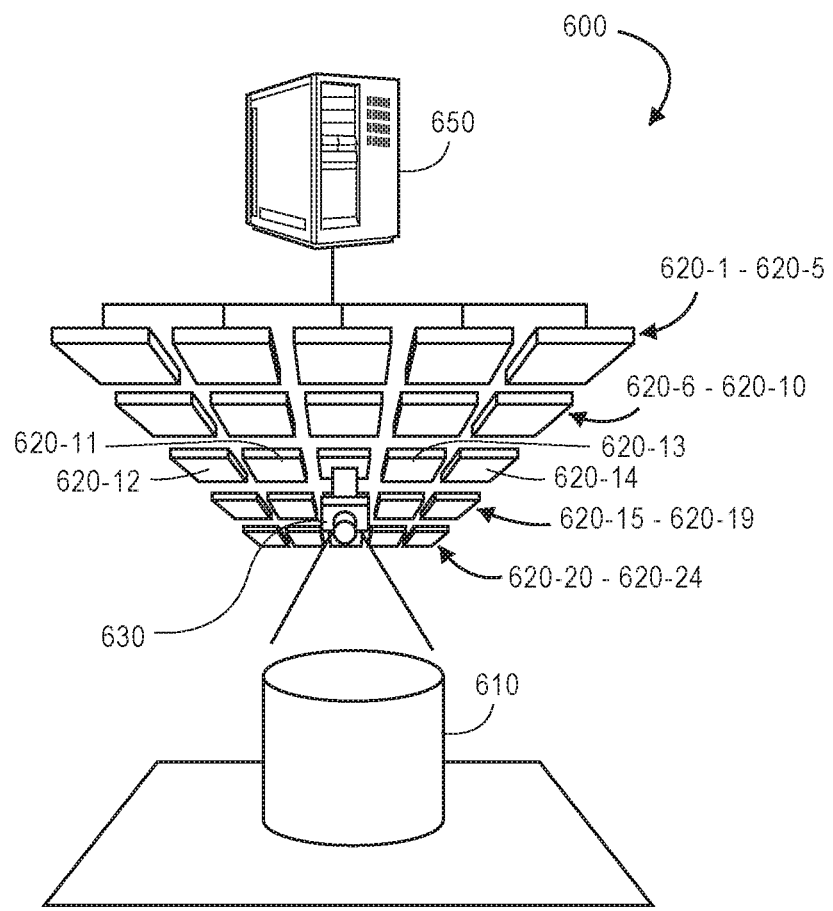
FIG. 6 is a view of components of an imaging system for addressing specular reflections in accordance with embodiments of the present disclosure.

The separation of specular artifacts within multiple images of a subject is defined based on the layout of the addressable illuminators with which the subject is illuminated. According to some embodiments of the present disclosure, a plurality of illuminators may be provided in an array or one or more groups, such that each of the illuminators may be independently controlled, e.g., by a computing device. Referring to FIG. 6, components of an imaging system 600 for addressing specular reflections in accordance with embodiments of the present disclosure are shown. Except where otherwise noted, reference numerals preceded by the number "6" in FIG. 6 indicate components or features that are similar to components or features having reference numerals preceded by the number "5" in FIG. 5, by the number "4" in FIG. 4, by the number "2" shown in FIG. 2, or by the number "1" shown in FIG. 1.

As is shown in FIG. 6, the system 600 includes a subject 610, an array of twenty-four addressable LED illuminators 620-1, 620-2 . . . 620-24 and an imaging device 630 mounted among the illuminators 620-1, 620-2 . . . 620-24 of the array. The illuminators 620-1, 620-2 . . . 620-24 and the imaging device 630 are each in communication with a computing device 650.

The illuminators 620-1, 620-2 . . . 620-24 are provided in five rows, including a first row of the illuminators 620-1 through 620-5, a second row of the illuminators 620-6 through 620-10, a third row of the illuminators 620-11, 620-12, 620-13 and 620-14 including the imaging device 630 therein, a fourth row of the illuminators 620-15 through 620-19 and a fifth row of the illuminators 620-20 through 620-24. Additionally, each of the illuminators 620-1, 620-2 . . . 620-24 is configured to cast light upon at least a portion of the subject 610. The illuminators 620-1, 620-2 . . . 620-24 may project white light, viz., light of all wavelengths of the visible spectrum, or light of any given color or wavelength, onto the subject 610. The illuminators 620-1, 620-2 . . . 620-24 may be further configured to operate individually or in groups, based on signals received from the computing device 650. The imaging device 630 is configured to capture one or more still or moving images of the subject 610, and the operation of the imaging device 630 may be synchronized with the operation of one or more of the illuminators 620-1, 620-2 . . . 620-24.

Figure 7A:
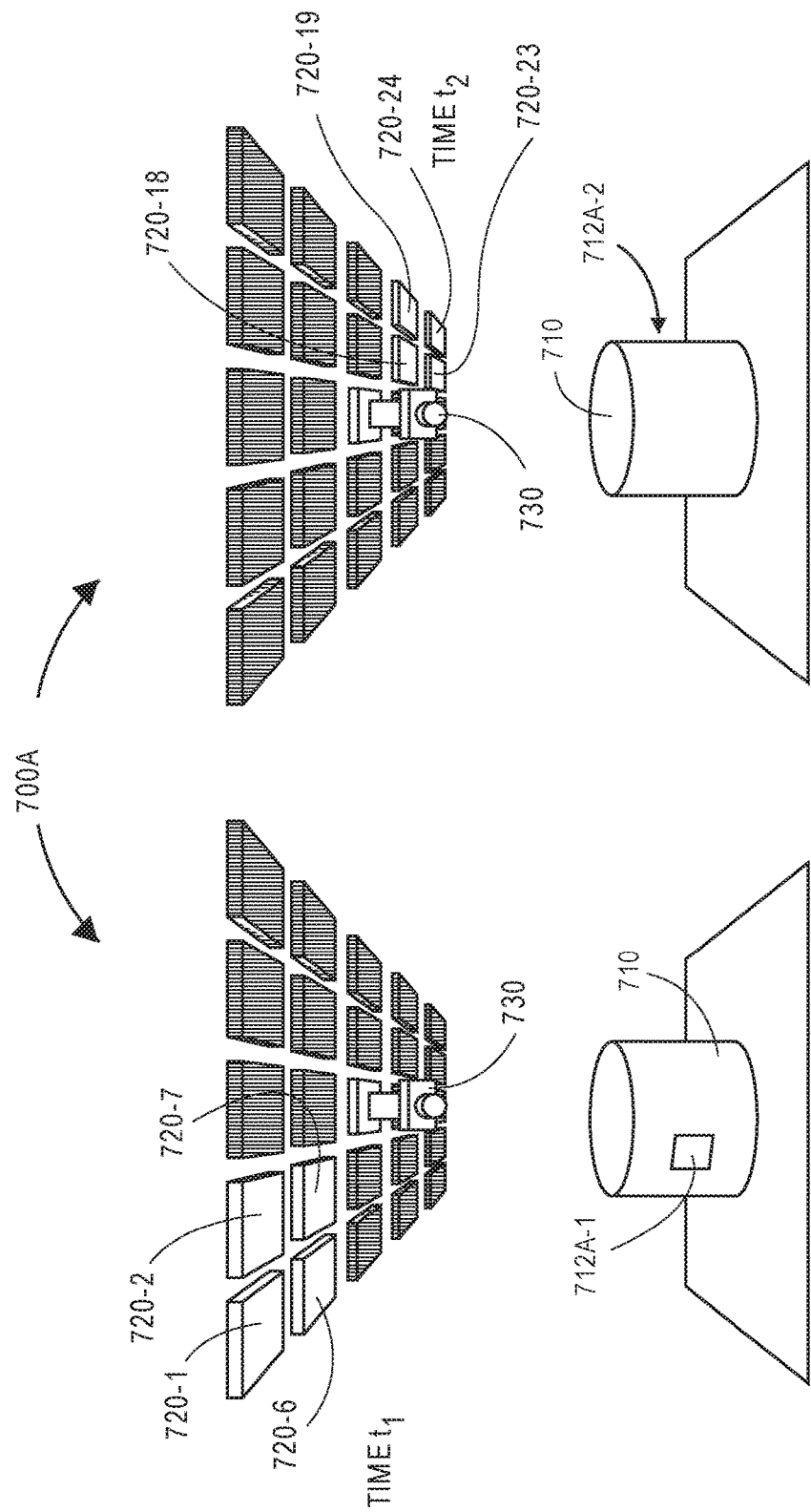
FIGS. 7A, 7B and 7C are views of components of an imaging system for addressing specular reflections in accordance with embodiments of the present disclosure.
Figure 7B:
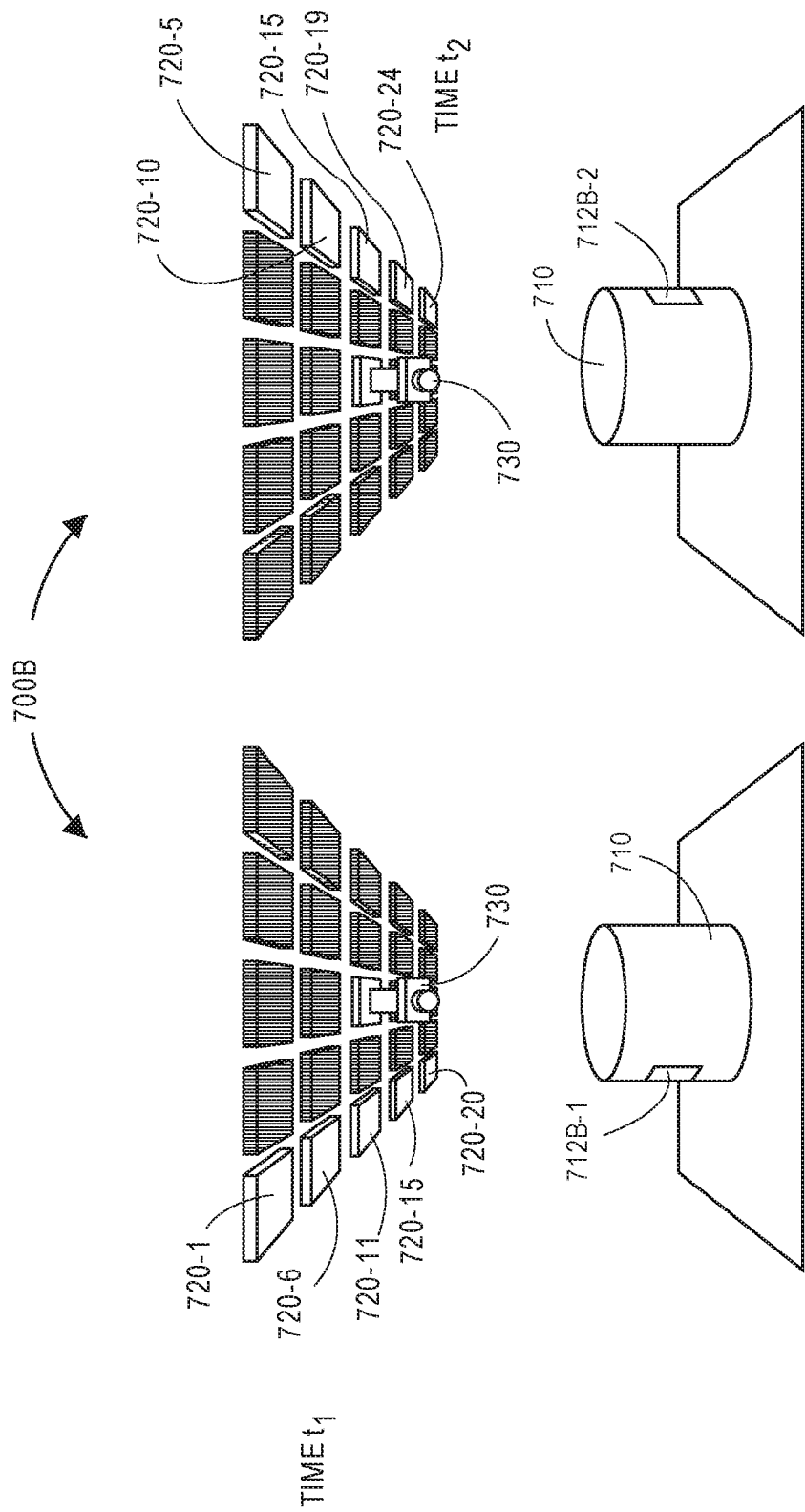
Figure 7C:
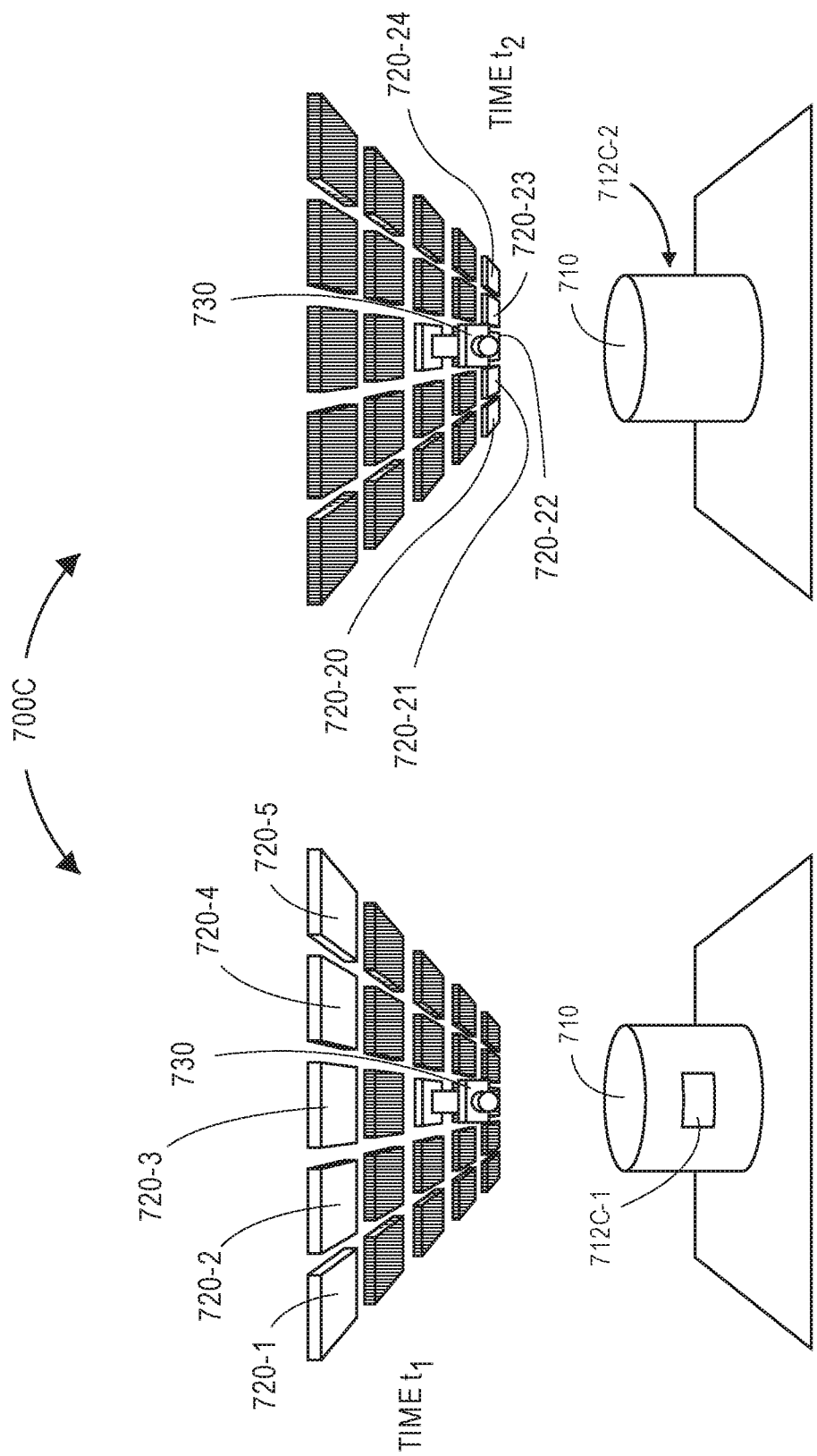

Accordingly, an array of addressable lights, such as the array of illuminators 620-1, 620-2 . . . 620-24 shown in FIG. 6, may be used to provide various lighting conditions onto a subject, and one or more images of the subject may be captured with the subject in such lighting conditions. Referring to FIGS. 7A, 7B and 7C, views of components of imaging systems 700A, 700B, 700C for addressing specular reflections in accordance with embodiments of the present disclosure are shown. Except where otherwise noted, reference numerals preceded by the number "7" in FIG. 7A, 7B or 7C indicate components or features that are similar to components or features having reference numerals preceded by the number "6" in FIG. 6, by the number "5" in FIG. 5, by the number "4" in FIG. 4, by the number "2" shown in FIG. 2, or by the number "1" shown in FIG. 1.

As is shown in FIG. 7A, according to some embodiments, the system 700A is configured to illuminate a subject 710 using a first group of four illuminators 720-1, 720-2, 720-6, 720-7, which are positioned above, to the front and to the left of the subject 710, at time $t_1$. Therefore, a point 712A-1 of specular reflection of light from the illuminators 720-1, 720-2, 720-6, 720-7 may be seen on a front left portion of the subject 710, and light from the specular reflection will appear in a specular artifact or specular defect within an image of the subject 710 captured using the imaging device 730 at time $t_1$. Subsequently, the system 700A may turn off the first group of the illuminators 720-1, 720-2, 720-6, 720-7, and turn on a second group of four illuminators 720-18, 720-19, 720-23, 720-24 at time $t_2$. A point 712A-2 of specular reflection of light from the illuminators 720-18, 720-19, 720-23, 720-24 may be seen on a rear right portion of the subject 710, and light from the specular reflection will appear in a specular artifact or specular defect within an image of the subject 710 captured using the imaging device 730 at time $t_2$.

Thus, depending on the surface texture and orientation of the subject with respect to the imaging device 730, points of specular reflection of light may appear at diametrically opposite portions of the subject upon being illuminated by the first group of the illuminators 720-1, 720-2, 720-6, 720-7 at time $t_1$ and by the second group of the illuminators 720-18, 720-19, 720-23, 720-24 at time $t_2$. Because the points 712A-1, 712A-2 of specular reflection on the subject 710 are sufficiently distinct, the effects of any specular artifacts or specular defects within images of the subject 710 that are captured at time $t_1$ or time $t_2$ may be reduced or minimized by forming an aggregate or composite image from such images.

As is shown in FIG. 7B, the system 700B is configured to illuminate a subject using a first line of illuminators 720-1, 720-6, 720-11, 720-15, 720-20 in the array at time $t_1$, and a point 712B-1 of specular reflection of light from the illuminators 720-1, 720-6, 720-11, 720-15, 720-20 may be seen on a left portion of the subject 710. Light from the specular reflection will appear in a specular artifact or specular defect within an image captured using the imaging device 730 at time $t_1$. Subsequently, the system 700B may turn off the first line of the illuminators 720-1, 720-6, 720-11, 720-15, 720-20, and turn on a second line of illuminators 720-5, 720-10, 720-14, 720-19, 720-24 in the array at time $t_2$. A point 712B-2 of specular reflection of light from the illuminators 720-5, 720-10, 720-14, 720-19, 720-24 may be seen on a right portion of the subject 710. Light from the specular reflection will appear in a specular artifact or specular defect within an image captured using the imaging device 730 at time $t_2$.

Thus, depending on the surface texture and orientation of the subject with respect to the imaging device 730, points of specular reflection of light may appear on either side of the subject upon being illuminated by the first line of the illuminators 720-1, 720-6, 720-11, 720-15, 720-20 at time $t_1$ and by the second line of the illuminators 720-5, 720-10, 720-14, 720-19, 720-24 at time $t_2$. Because the points 712B-1, 712B-2 of specular reflection are sufficiently separate, the effects of any specular artifacts or specular defects within images of the subject 710 that are captured at time $t_1$ or time $t_2$ may be reduced or minimized by forming an aggregate or composite image from such images. Similarly, as is shown in FIG. 7C, the system 700C is configured to illuminate a subject using a third line of illuminators 720-1, 720-2, 720-3, 720-4, 720-5 at time $t_1$ and a fourth line of illuminators 720-20, 720-21, 720-22, 720-23, 720-24 at time $t_2$. The effects of any specular artifacts or specular defects at points 712C-1, 712C-2 within images of the subject 710 that are captured at time $t_1$ or time $t_2$ by the system 700C may also be reduced or minimized by forming an aggregate or composite image from such images.

Accordingly, using an array of addressable lights, such as the illuminators 720-1, 720-2 . . . 720-24 of FIGS. 7A, 7B and 7C, a subject may be placed in a number of different lighting conditions, each of which may result in different types or forms of specular reflections. The selection of the specific illuminators that are to be illuminated may be made on any basis regarding the shape or any dimension of the subject, an angle of incident light from each of the illuminators to the subject with respect to a normal from a surface of the subject, or an angle of radiant light from the surface of the subject to the imaging device with respect to the normal, in order to ensure that any specular reflections of light from the subject are provided in distinct points on the surface during different lighting conditions, and result in discrete specular artifacts or specular defects within two or more images of the subject captured during such lighting conditions. The images may be evaluated in order to identify and locate the specular artifacts or specular defects expressed therein, and an aggregate or composite image of the subject may be formed from the images.

Figure 8:
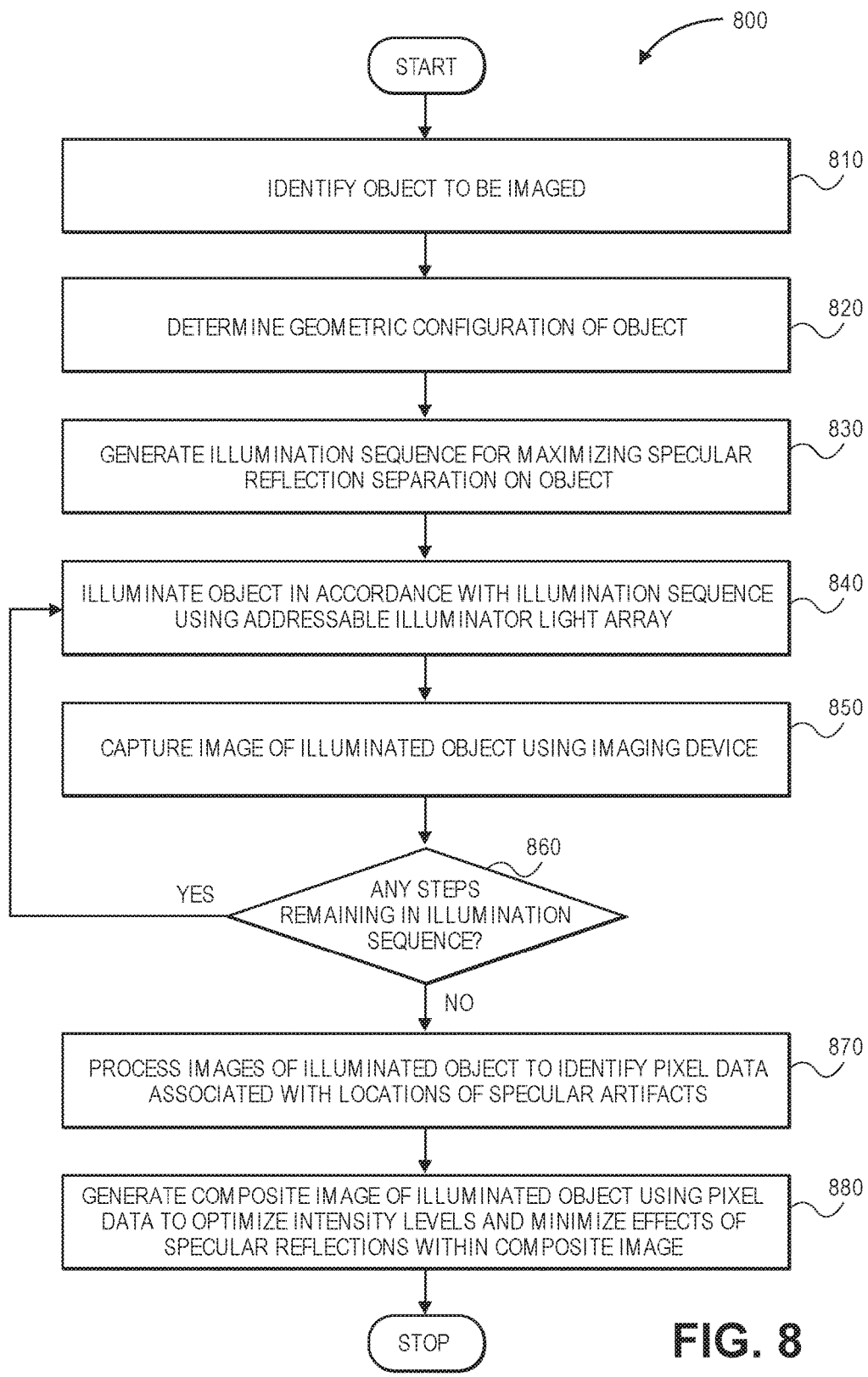
FIG. 8 is a flow chart of one process for capturing images using an imaging system for addressing specular reflections in accordance with embodiments of the present disclosure.

Referring to FIG. 8, a flow chart 800 of one process for capturing images using an imaging system for addressing specular reflections in accordance with embodiments of the present disclosure is shown. At box 810, an object to be imaged is identified, and at box 820, a geometric configuration of the object is determined. For example, the object may be a plastic-wrapped item traveling along a conveyor in a fulfillment center, an automobile in a showroom, or any other regularly or erratically shaped object having one or more smooth surfaces that may be subject to specular reflection of light in one or more wavelengths.

At box 830, an illumination sequence for maximizing the separation of specular reflections on the object is defined. The illumination sequence may define the operation of any number of the illuminators in the array at various times, in order to create one or more discrete lighting conditions, as well as the operation of the imaging device while the object is illuminated in accordance with such lighting conditions. The illumination sequence may be further defined based on the reflective properties of the object, which may be estimated according to one or more models or functions, such as a BRDF. For example, depending on the size, shape or orientation of the array, and the surface properties of the object, an illumination sequence may be defined by any number of groups of one or more of the illuminators that will sufficiently illuminate the object, and may maximize a distance between any points of specular reflection on a surface of the object. The individual illuminators to be operated in accordance with the illumination sequence, and the manner in which such illuminators are to be operated, may be selected on any basis in accordance with the present disclosure. For example, the illuminators may be selected based on the geometric configuration of the object determined at box 820 or one or more dimensions thereof, as well as any historical information that may be known regarding the smoothness of one or more surfaces of the object. Additionally, according to the illumination sequence, the groups of illuminators may be operated at any given time or rate.

At box 840, the object is illuminated in accordance with the illumination sequence. For example, one or more control signals may be provided to the illuminators of a group, e.g., individual LED lights arranged at a single point of the array, or in a portion of the array, which may cause such illuminators to cast light upon the object from their respective positions in the array. At box 850, an image of the illuminated object is captured using the imaging device, e.g., while the object is illuminated in accordance with box 840. According to some embodiments, the operation of the imaging device may be synchronized with the operation of the respective illuminators, and the imaging device and the illuminators may be operated based on a single control signal from a computing device, or from independent control signals issued from the computing device.

At box 860, it is determined whether the illumination sequence includes any other steps. The illumination sequence defined at box 830 may include any number of groups of illuminators that may be configured to illuminate the object for any duration and at any time. If the illumination sequence includes any additional steps, then the process returns to box 840, where the object is illuminated again in accordance with the illumination sequence, e.g., using another group of the illuminators, and to box 850, where another image of the illuminated object is captured using the imaging device.

If the illumination sequence does not include any additional steps, however, then the process advances to box 870, where the images of the illuminated object are processed to identify pixel data associated with locations of specular artifacts therein. For example, if the surface of the object includes one or more sufficiently smooth aspects, and the object is illuminated at different times from different angles using different numbers or types of illuminators, one or more points of specular reflection may appear at different locations on the surface, and one or more specular artifacts may appear in images of the object captured at the different times. Therefore, by processing multiple images of the object, the various pixels corresponding to the surface that have intensity values consistent with specular reflections, and thereby correspond to locations of specular artifacts within one or more of the images, may be identified. However, if the object does not include any smooth surfaces, e.g., if the reflection of light from the surface of the object is simply diffuse, then the intensity values of the various pixels may be substantially identical.

At box 880, a composite image of the illuminated object is generated using the pixel data to optimize the intensity levels and minimize the effects of specular reflections within the composite image, and the process ends. The composite image is formed from pixels having the most appropriate intensity values expressed within the sets of pixel data, e.g., by excluding pixels having uncharacteristically high intensity values that may be consistent with specular artifacts, and including lower-intensity pixels corresponding to the same locations that may be obtained from other images. In this regard, the composite image may reduce or minimize the number or extent of any specular artifacts within such images that may be caused by the illumination of the object using different groups of illuminators in the array.

Figure 9A:
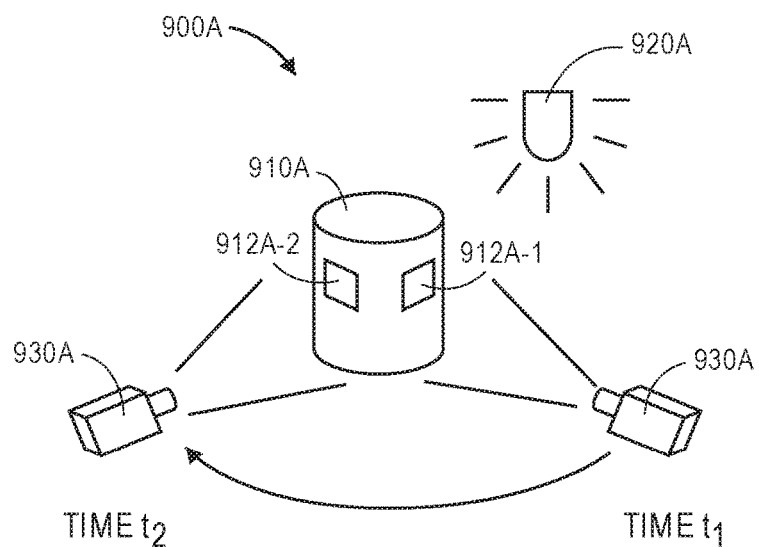
FIGS. 9A and 9B are views of components of imaging systems for addressing specular reflections in accordance with embodiments of the present disclosure.
Figure 9B:
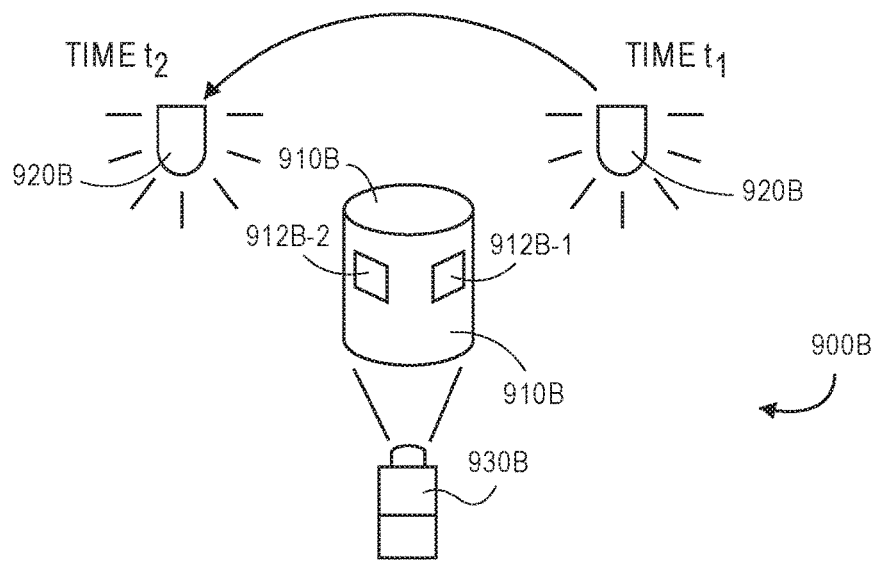

Accordingly, the adverse effects caused by the specular reflection of light from surfaces of objects may be alleviated by capturing images of the objects in different lighting conditions, and forming an aggregate or composite image of the object from the pixels having the lowest levels of intensity. However, those of ordinary skill in the pertinent arts will recognize that the lighting conditions may be formed from a single light source, and that the images may be captured using multiple cameras, in accordance with the present disclosure. Referring to FIGS. 9A and 9B, components of imaging systems 900A, 900B for addressing specular reflections in accordance with embodiments of the present disclosure are shown. Except where otherwise noted, reference numerals preceded by the number "9" in FIG. 9A or 9B indicate components or features that are similar to components or features having reference numerals preceded by the number "7" in FIG. 7A, 7B or 7C, by the number "6" in FIG. 6, by the number "5" in FIG. 5, by the number "4" in FIG. 4, by the number "2" shown in FIG. 2, or by the number "1" shown in FIG. 1.

The system 900A includes a subject 910A, an illuminator 920A and an imaging device 930A. The illuminator 920A is configured to cast light upon the subject 910A from a fixed position. The imaging device 930A is mobile and is configured to capture images or imaging data based on light reflected from the subject 910A from multiple positions at time $t_1$ and time $t_2$. Because specular reflection is determined based at least in part on positions of a light source and an optical sensor (e.g., a sensor included in an imaging device) with respect to a subject, the imaging device 930A may observe a first point 912A-1 of specular reflection of light from a surface of the subject 910A at time $t_1$, when the imaging device 930A is in a first position, and a second point 912A-2 of specular reflection of light from the surface of the subject 910A at time $t_2$, when the imaging device 930A is in a second position. Therefore, images or imaging data captured from the imaging device 930A at time $t_1$ and time $t_2$ may be analyzed to identify the pixels having the optimal levels of intensity therein, and combined with one another to form an aggregate or composite image of the subject 910A which does not include any specular artifacts caused by such specular reflection, or which otherwise reduces the effects of the specular reflection of light from the subject 910A.

Similarly, the system 900B also includes a subject 910B, an illuminator 920B and an imaging device 930B. The illuminator 920B is configured to cast light upon the subject 910B from multiple positions at time $t_1$ and time $t_2$. The imaging device 930B is fixed in position and is configured to capture images or imaging data based on light reflected from the subject 910B. The imaging device 930B may observe a first point 912B-1 of specular reflection of light from a surface of the subject 910B at time $t_1$, when the illuminator 920B is in a first position, and a second point 912B-2 of specular reflection of light from the surface of the subject 910B at time $t_2$, when the illuminator 920B is in a second position. Images or imaging data captured using the imaging device 930B at time $t_1$ and time $t_2$ may also be analyzed to identify the pixels having the optimal levels of intensity therein, and the pixels from either image having the optimal levels of intensity may be combined to form a composite image of the subject 910B.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments described herein or shown in the accompanying figures refer to the use of imaging devices in connection with the fulfillment of orders of items that have been place at an online marketplace, viz., at fulfillment centers, the systems are not so limited, and may be utilized in connection any relevant application in which the use of cameras or sensors to capture images from objects that may be subject to specular reflection may be desired.

For example, although some of the sources of light referenced herein are artificial, e.g., illuminators containing one or more artificial light sources, such as LEDs, the systems and methods disclosed herein may be further utilized to address specular reflections of light from the sun or any other type or form of light source. References to a "primary" or "first" imaging device or illuminator herein, or a "secondary" or "second" imaging device or illuminator herein, are ordinal in nature, and do not imply any limitation in the capacity or function of either imaging device or illuminator. Rather, except where otherwise expressly noted herein, a "primary" or "first" imaging device or illuminator may perform the same functions as a "secondary" or "second" imaging device or illuminator, and vice versa.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 8, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   causing at least one illumination element to illuminate an object;
   causing at least one imaging device to capture a first image of the object when the at least one imaging device is at a first position;
   identifying a specular artifact within the first image, wherein the specular artifact corresponds to a first point of specular reflection of light on a surface of the object;
   causing movement of the at least one imaging device from the first position to a second position based at least in part on the specular artifact corresponding to the first point of specular reflection of light on the surface of the object;
   causing the at least one imaging device to capture a second image of the object when the at least one imaging device is at the second position;
   identifying a plurality of pixels corresponding to the first point of specular reflection of light on the surface of the object within the second image; and
   generating a composite image of the object based at least in part on the first image and the second image, wherein the composite image of the object comprises at least the plurality of pixels corresponding to the first point of specular reflection of light on the surface of the object within the second image.

2. The method of claim 1, further comprising:
   determining a location of the first point of specular reflection of light on the surface of the object; and
   selecting the second position of the at least one imaging device based at least in part on the location of the first point of specular reflection of light.

3. The method of claim 1, further comprising:
   causing the at least one illumination element to illuminate the object at a first time;
   causing the at least one imaging device to capture the first image of the object at the first time from the first position;
   causing the at least one illumination element to illuminate the object at a second time; and
   causing the at least one imaging device to capture the second image of the object at the second time from the second position.

4. The method of claim 1, wherein the at least one illumination element comprises a light emitting diode.

5. A method comprising:
   illuminating an object by an illuminator at a first time;
   capturing a first image of the object using an imaging device while the object is illuminated by the illuminator, wherein the illuminator and the imaging device comprise a first configuration relative to each other at the first time, and wherein a first portion of the first image of the object comprises a specular artifact including a point of specular reflection of light;
   subsequent to capturing the first image of the object and prior to capturing a second image of the object, causing movement of at least one of the illuminator or the imaging device from the first configuration to a second configuration based at least in part on the specular artifact including the point of specular reflection of light;
   illuminating the object by the illuminator at a second time;
   capturing the second image of the object using the imaging device while the object is illuminated by the illuminator, wherein the illuminator and the imaging device comprise the second configuration relative to each other at the second time, and wherein a second portion of the second image of the object corresponds to the first portion of the first image of the object; and
   generating, by at least one computer processor, a composite image based at least in part on the first image and the second image,
   wherein the composite image comprises the second portion of the second image.

6. The method of claim 5, wherein the illuminator comprises a light emitting diode, and
   wherein at least one computing device is configured to control an operation of the light emitting diode and an operation of the imaging device.

7. The method of claim 5, wherein generating the composite image based at least in part on the first image and the second image further comprises:
   identifying a first plurality of pixels corresponding to the specular artifact in the first image, wherein the specular artifact includes the point of specular reflection of light from a first point on a surface of the object, and wherein the first portion of the first image comprises the first plurality of pixels; and
   identifying a second plurality of pixels corresponding to the first point on the surface of the object in the second image, wherein the second portion of the second image comprises the second plurality of pixels.

8. The method of claim 5, wherein generating the composite image based at least in part on the first image and the second image further comprises:
identifying a first set of imaging data associated with the first image, wherein the first set of imaging data comprises first intensity values for each of a first plurality of pixels corresponding to the object; and
identifying a second set of imaging data associated with the second image, wherein the second set of imaging data comprises second intensity values for each of a second plurality of pixels corresponding to the object.

9. The method of claim 8, wherein generating the composite image based at least in part on the first image and the second image further comprises:
defining a third plurality of pixels corresponding to the object based at least in part on the first plurality of pixels and the second plurality of pixels, wherein each of the third plurality of pixels is the one of the first plurality of pixels or the second plurality of pixels having an optimum intensity value; and
generating the composite image based at least in part on the third plurality of pixels.

10. The method of claim 9, wherein, for each of the plurality of pixels, the optimum intensity value is a lower one of the first intensity value or the second intensity value.

11. The method of claim 9, wherein, for each of the plurality of pixels, the optimum intensity value is defined based at least in part on a bidirectional reflectance distribution function.

12. The method of claim 5, further comprising:
selecting the first configuration of the illuminator and the imaging device;
determining the point of specular reflection of light from the first configuration; and
selecting the second configuration of the illuminator and the imaging device based at least in part on the point of specular reflection of light from the first configuration, wherein the second configuration is different than the first configuration.

13. The method of claim 5, wherein illuminating the object by the illuminator at the first time comprises:
illuminating the object by the illuminator from a first illuminator position of the first configuration at the first time, and
wherein illuminating the object by the illuminator at the second time comprises:
illuminating the object by the illuminator from a second illuminator position of the second configuration at the second time.

14. The method of claim 5, wherein capturing the first image of the object using the imaging device comprises:
capturing the first image of the object by the imaging device from a first imaging device position of the first configuration at the first time, and
wherein capturing the second image of the object using the imaging device comprises:
capturing the second image of the object by the imaging device from a second imaging device position of the second configuration at the second time.

15. A method comprising:
determining at least one surface property of an object;
selecting a first position of an illuminator based at least in part on the at least one surface property of the object;
capturing a first set of imaging data regarding the object using an imaging device;
determining a point of specular reflection of light from the first position of the illuminator on a surface of the object based at least in part on the at least one surface property of the object, wherein the point of specular reflection comprises a first portion of the first set of imaging data;
selecting a second position of the illuminator based at least in part on the point of specular reflection of light from the first position of the illuminator on the surface of the object;
capturing a second set of imaging data regarding the object using the imaging device, wherein a second portion of the second set of imaging data corresponds to the first portion of the first set of imaging data;
generating, by at least one computer processor, a composite image based at least in part on the first set of imaging data and the second set of imaging data, wherein the composite image comprises the second portion of the second set of imaging data.

16. The method of claim 15, further comprising:
causing movement of the illuminator to the first position prior to a first time;
capturing the first set of imaging data regarding the object at the first time using the imaging device, wherein the first set of imaging data comprises intensity values of a first plurality of pixels corresponding to the object;
causing movement of the illuminator to the second position prior to a second time;
capturing the second set of imaging data regarding the object at the second time using the imaging device, wherein the second set of imaging data comprises intensity values of a second plurality of pixels corresponding to the object;
selecting a third plurality of pixels corresponding to the object based at least in part on the intensity values of the first plurality of pixels and the intensity values of the second plurality of pixels,
wherein each of the third plurality of pixels corresponding to the object is one of the first plurality of pixels corresponding to the object or the second plurality of pixels corresponding to the object having a lower intensity; and
generating the composite image of the object further based at least in part on the third plurality of pixels corresponding to the object.

17. The method of claim 15, wherein the at least one surface property of the object comprises a radius of curvature of a surface of the object, a dimension of the object or a texture of the surface of the object.

18. The method of claim 15, further comprising:
capturing the first set of imaging data regarding the object using the imaging device from a first imaging device position; and
capturing the second set of imaging data regarding the object using the imaging device from a second imaging device position;
wherein the first position of the illuminator and the first imaging device position comprise a first configuration;
wherein the second position of the illuminator and the second imaging device position comprise a second configuration;
wherein the first configuration is different than the second configuration.

* * * * *